(12) United States Patent
Sato

(10) Patent No.: US 6,508,063 B2
(45) Date of Patent: Jan. 21, 2003

(54) GAS ABSORPTION AND RELEASE APPARATUS AND METHOD OF CONTROLLING THE APPARATUS

(75) Inventor: Yukio Sato, Hokkaido (JP)

(73) Assignee: The Japan Steel Works, Ltd., Tokyo (JP)

( * ) Notice: Subject to any disclaimer, the term of this patent is extended or adjusted under 35 U.S.C. 154(b) by 0 days.

(21) Appl. No.: 09/933,735

(22) Filed: Aug. 22, 2001

(65) Prior Publication Data

US 2002/0026964 A1 Mar. 7, 2002

(30) Foreign Application Priority Data

Aug. 23, 2000 (JP) ..................................... 2000-252027

(51) Int. Cl.[7] ................................................. F17C 9/02
(52) U.S. Cl. ......................................................... 62/48.1
(58) Field of Search ............................. 62/48.1, 49.1, 62/159

(56) References Cited

U.S. PATENT DOCUMENTS

| 4,561,287 A | 12/1985 | Rowland |
| 5,882,384 A | 3/1999 | Tom et al. |
| 5,916,245 A | 6/1999 | Tom |

Primary Examiner—William C. Doerrler
Assistant Examiner—Malik N. Drake
(74) Attorney, Agent, or Firm—Sughrue Mion, PLLC

(57) ABSTRACT

Pressure detection means are provided to detect a gas pressure in a gas absorption and release container. A judgment portion judges the limit of gas absorption and release on the basis of comparison between the gas pressure detected by the pressure detection means and a setting pressure predetermined in a setting portion. A control portion sends out a control signal to a heat medium means, a gas supply means and a gas transportation means on the basis of the result of the judgment to thereby switch over the operation between gas absorption and gas release.

5 Claims, 4 Drawing Sheets

GAS ABSORPTION AND RELEASE APPARATUS AND METHOD OF CONTROLLING THE APPARATUS

BACKGROUND OF THE INVENTION

1. Field of the Invention

The present invention relates to an apparatus which uses a reaction attended with gas absorption and release in a gas absorption and release substance such as a hydrogen storage alloy or which uses a reaction attended with heat using the function of gas absorption and release or heat absorption and release in a refrigerator or the like, and further relates to a method of controlling the apparatus.

The present application is based on Japanese Patent Application No. 2000-252027, which is incorporated herein by reference.

2. Description of the Related Art

Because a gas absorption and release substance such as a hydrogen storage alloy produces a reaction of absorption or release of a gas such as hydrogen attended with heat absorption and generation, various kinds of systems using this reaction have been heretofore proposed.

For example, a hydrogen storage alloy produces absorption and release of heat when the hydrogen storage alloy absorbs or releases hydrogen. Hence, there have been proposed apparatuses in which absorption or release of hydrogen is performed by a pressure or temperature operation so that air-conditioning, refrigeration or heat recovery is made by using the heat generated in the absorption and release of the hydrogen. There have been also proposed apparatuses in which hydrogen storage, conveyance, recovery, purification or the like are performed by using the absorption and release of heat.

Referring to FIGS. 4 and 5, the gas absorption and release apparatus meeting the aforementioned purpose will be described. as supply unit 4 is connected to a gas absorption and release container 1 containing a gas absorption and release substance through an electromagnetic valve 2 and a gas supply passage 3. A gas-using unit 7 is connected also to the gas absorption and release container 1 through an electromagnetic valve 5 and a gas release passage 6.

A heat medium introduction passage 8 and a heat medium discharge passage 9 are further connected to the gas absorption and release container 1. A cooling heat medium supply unit 12 is connected to the heat medium introduction passage 8 through a pump 10 and a cooling heat medium supply passage 11. A heating heat medium supply unit 15 is connected also to the heat medium introduction passage 8 through a pump 13 and a heating heat medium supply passage 14. On the other hand, a cooling heat medium return passage 17 is connected to the heat medium discharge passage 9 through an electromagnetic valve 16. A heating heat medium return passage 19 is connected also to the heat medium discharge passage 9 through an electromagnetic valve 18. Incidentally, the electromagnetic valves 2, 5, 16 and 18 and the pumps 10 and 13 are subjected to centralized control by a control unit 20.

In the aforementioned apparatus, when gas is absorbed into or released from the gas absorption and release substance, the electromagnetic valves and the pumps are controlled by the control unit 20 in accordance with the operation of gas absorption/release.

That is, the gas absorption and release substance has limits in quantity of gas absorption and release. In the aforementioned apparatus, therefore, absorption or release is stopped when absorption or release reaches its limit respectively, and, at the same time, the operation is switched over between absorption and release so that gas absorption and release are repeated.

In the related art, the judgment as to whether or not gas absorption/release into/from the gas absorption and release substance reaches its limit is made in consideration of the predicted absorption/release capacity (the quantity or rate of absorption/release) of the substance. For example, there has been used a method in which time is measured from the start of absorption or release and judgment is made that the absorption or release reaches its limit when the measured time reaches a setting value, or a method in which a gas flow meter 21 is disposed in the absorption/release passage 6 or the like as shown in FIG. 5, and judgment is made that the absorption or release reaches its limit when the gas flow rate, that is, the quantity of gas absorption/release reaches a setting value.

According to the related-art judgment method, if the actual absorption/release capacity of the gas absorption/release capacity exceeds a setting value (predicted value), switching-over is performed without making the full use of the absorption/release capacity of the gas absorption and release substance respectively. Hence, absorption and release are repeated by a larger number of times than required. Hence, the absorption and release substance is apt to deteriorate rapidly. Moreover, sensible-heat loss caused by repetition of heating and cooling of the container containing the absorption and release substance increases, so that energy efficiency becomes poor. On the other hand, when the actual absorption/release capacity is reduced to be smaller than the setting value with the deterioration of the gas absorption and release substance, the operation is not switched over between absorption and release even in the case where the capacity exceeds its limit. The reason is as follows. That is, a blank period in which the capacity cannot be fulfilled is generated, so that the apparatus cannot make the full use of its capacity (the quantity of gas recovery, gas supply, or heat absorption or release per unit time, and so on). Moreover, wasteful motive power is generated for transporting the heating/cooling heat medium during the blank period.

SUMMARY OF THE INVENTION

The present invention is devised upon such circumstances and an object thereof is to provide a gas absorption and release apparatus using a gas absorption and release substance in which a gas absorption or gas release is switched over accurately in accordance with the actual absorption/release capacity of the gas absorption and release substance to thereby make it possible to perform the operation efficiently, and to provide a method of controlling the gas absorption and release apparatus.

In order to achieve the above object, according to a first aspect of the present invention, there is provided a method of controlling a gas absorption and release apparatus using a gas absorption and release substance in which the gas absorption and release substance is heated/cooled by a high-temperature/low-temperature heat medium and a gas absorption/release reaction attended with heat absorption/generation is produced in the gas absorption and release substance, the method comprising the steps of: detecting a gas pressure at the time of gas absorption/release; and judging a limit of gas absorption/release on the basis of comparison between the detected pressure and a predetermined setting pressure.

According to a second aspect of the present invention, preferably, in a method of controlling a gas absorption and release apparatus using a gas absorption and release substance as stated in the above first aspect, judgment of the limit of gas absorption is made when the pressure detected at the time of gas absorption is higher than the setting pressure for gas absorption.

According to a third aspect of the present invention, preferably, in a method of controlling a gas absorption and release apparatus using a gas absorption and release substance as stated in the above first or second aspect, judgment of the limit of gas release is made when the pressure detected at the time of gas release is lower than the setting pressure for gas release.

According to a fourth aspect of the present invention, preferably, in a method of controlling a gas absorption and release apparatus using a gas absorption and release substance as stated in any one of the above first through third aspects, judgment of the limit of gas absorption/release is made when relation between the detected pressure and the setting pressure on the basis of a result of the comparison is retained for a fixed period.

Further, according to a fifth aspect of the present invention, there is provided a gas absorption and release apparatus using a gas absorption and release substance, comprising a gas absorption and release container for receiving the gas absorption and release substance airtightly, a heat medium supply means for selectively supplying a high-temperature/low-temperature heat medium to the gas absorption and release container to heat/cool the gas absorption and release substance, a gas supply means for supplying a gas to the gas absorption and release container to make the gas absorption and release substance absorb the gas, and a gas transportation means for taking out a gas released from the gas absorption and release substance, from the gas absorption and release container and transporting the gas to a gas-using portion, wherein the apparatus further comprises one pressure detection means provided in at least one place among a gas supply passage between the gas supply means and the gas absorption and release container, a gas-receiving space in the gas absorption and release container, and a gas transportation passage in the gas transportation means for detecting a gas pressure, a judgment portion for comparing the pressure detected by the pressure detection means with a predetermined setting pressure so as to judge a limit of gas absorption and release on the basis of the comparison, and an absorption and release control portion for outputting a control signal to switch gas absorption and release to the heat medium supply means, to the gas supply means and to the gas transportation means on the basis of a result of the judgment in the judgment portion.

Incidentally, in the present invention, gas absorption and release are performed by use of a gas absorption and release substance. Although a typical example of the substance is a hydrogen storage alloy, any suitable material may be used if the material can make a gas absorbing and releasing reaction so that heat absorption or release occurs consequently. For example, a material capable of adsorbing and desorbing a gas as an adsorbent or a material capable of absorbing and releasing a gas by a reaction can be used. That is, the "gas absorption" includes gas adsorption and the "gas release" includes gas desorption. The material may be a material capable of absorbing and releasing a gas reversibly. Examples of this type of material are activated carbon, carbon fiber, zeolite, activated alumina, and soon. Alternatively, the material may be a material capable of absorbing and releasing hydrogen gas reversibly by a chemical reaction. The aforementioned hydrogen storage alloy is an example of the material of this type.

Any suitable gas in accordance with the kind of the substance is selected as the gas absorbed and released by the aforementioned substance. For example, hydrogen gas is selected for the hydrogen storage alloy.

The gas absorption and release substance absorbs and releases a gas by being heated and cooled through a high-temperature/low-temperature heat medium. Generally, the gas absorption and release substance is contained in a gas absorption and release container airtightly. Gas absorption and release passages are connected to the container. One pipe or the like may be used both as an absorption passage and as a release passage. Alternatively, an absorption passage and a release passage may be provided separately.

Further, the heat medium is introduced into the container so that heat exchange can be performed between the heat medium and the gas absorption and release substance. The configuration of a heat medium receiving space and a heat medium moving passage in the container is not particularly limited and any configuration may be used so long as heat exchange can be efficiently performed between the heat medium and the gas absorption and release substance.

The kind of the heat medium as to whether a high-temperature heat medium or a low-temperature heat medium is not particularly limited in the present invention and can be determined suitably in consideration of the temperature for heating/cooling, or the like. The method of supplying the heat medium is also optional.

Further, the gas to be absorbed to the gas absorption and release container is generally supplied from a gas supply means, and the gas released from the gas absorption and release container is sent to a gas-using portion. A reservoir tank for reserving a gas can be used as the gas supply means. The gas-using portion can be supposed to have various purposes. Incidentally, the gas absorption and release apparatus is to use a gas or is to use heat absorption and release caused by gas absorption and release.

Further, another gas absorption and release apparatus making a pair with the gas absorption and release apparatus according to the present invention may be further provided as the gas supply means or as the gas-using portion.

In the present invention, a gas pressure is detected at the time of gas absorption and release. The detection may be performed either at the time of gas absorption or at the time of gas release or the detection may be performed both at the time of gas absorption and at the time of gas release. In order to perform absorption and release accurately, it is preferable that the gas pressure is detected both at the time of gas absorption and at the time of gas release.

The detection of the gas pressure is preferably performed in a position near to the gas absorption and release substance so that the atmospheric pressure of the gas absorption and release substance can be measured. The gas pressure is preferably detected in a gas-receiving space disposed in the gas absorption and release container. In the present invention, however, the method of detection is not limited thereto. For example, the gas pressure may be detected in a gas supply passage between the gas supply means and the gas absorption and release container or in a gas-transportation passage in a gas transportation means. Alternatively, the gas pressure may be detected in a plurality of positions among the aforementioned positions.

The setting pressure to be compared with the detected gas pressure can be set in advance while the gas pressure which appears when the capacity of the gas absorption and release substance reaches its limit is predicted. The limit of the capacity can be determined with the state, as a reference, in which gas absorption or release is little performed, or with the state, as a reference, in which gas absorption or release is reduced greatly. The degree thereof can be determined suitable. The condition for estimating that the capacity reaches its limit is determined to be used for comparison between the detected gas pressure and the setting pressure. For example, at the time of gas absorption, the condition that the detected pressure is higher than the setting value can be used for judging the limit of gas absorption. On the other hand, at the time of gas release, the condition that the detected pressure is lower than the setting value can be used for judging the limit of gas release.

Further, in the judgment of the limit, it is preferable that the detected pressure's arrival at the limit is judged when the aforementioned condition is kept for a predetermined period, because misjudge owing to disturbance or the like must be avoided and because the gas absorption and release reaction of the gas absorption and release substance is completed in a certain time after the detected pressure's arrival at the setting value. Although it is difficult to determine the retention time uniquely because the retention time depends also on the heat exchanging performance of the container with the absorption and release substance, the gas absorption and release rate of the absorption and release substance and the controlling characteristic of the system, the retention time can be determined suitably in consideration of the aforementioned performance or the like. For example, the appropriate time required for completing the gas absorption and release reaction of the gas absorption and release substance after the detected pressure's arrival at a setting value or the time required for disturbance is measured in the system in advance so that the retention time can be determined on the basis of the measured time.

In the controlling method according to the present invention, after the limit of gas absorption or release is judged in the aforementioned manner, gas absorption or release is stopped and the operation is switched over between gas absorption and gas release if it is desired. The series of operations can be performed in the control portion. The subjects to be controlled vary in accordance with the configuration of the apparatus because the subjects are necessary for switching over between gas absorption and gas release. Generally, the subjects to be controlled are valves provided in the gas supply and discharge passages, the supply portion of the gas supply unit, valves provided in the heat medium supply means, pumps as transportation means, etc.

According to the present invention, when a gas is absorbed and released, the limit of gas absorption and release can be judged at an appropriate time in accordance with the state of the gas absorption and release substance. Hence, the progress of the deterioration of the gas absorption and release substance can be suppressed. In addition, generation of wasteful motive power, or the like, can be prevented, so that efficient control can be made.

DETAILED DESCRIPTION OF THE PREFERRED EMBODIMENT

Figure 1:
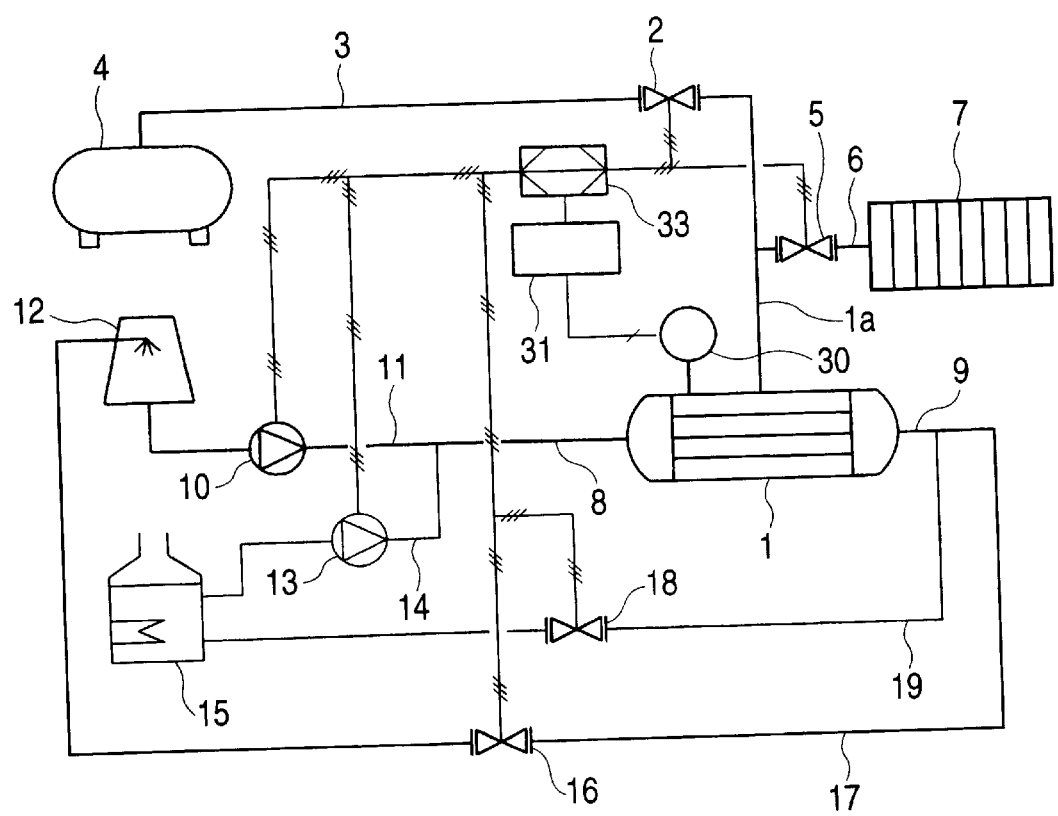
FIG. 1 is a schematic configuration view showing an embodiment of the present invention.
Figure 2:
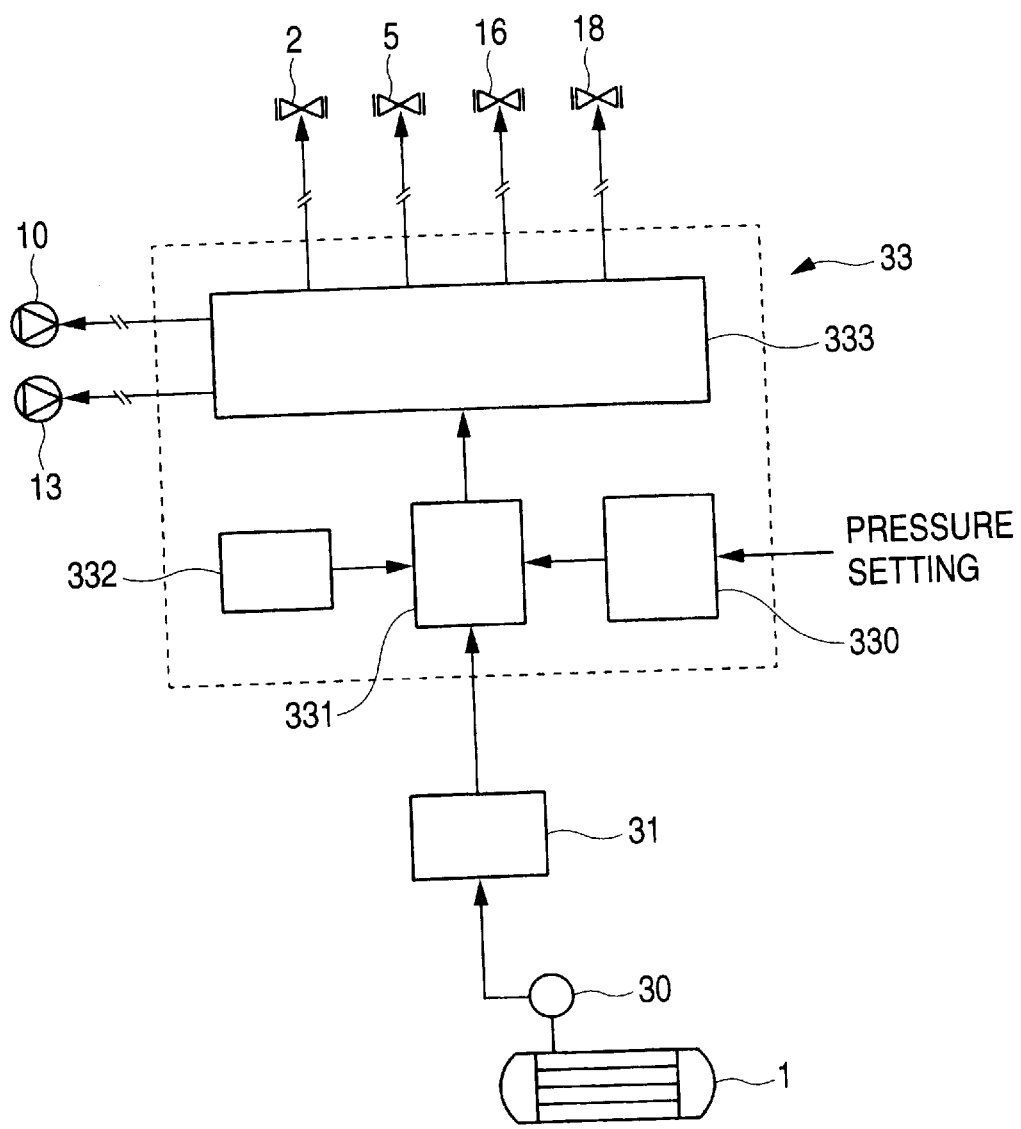
FIG. 2 is a block diagram showing a control unit in this embodiment.

An embodiment of the present invention will be described below with reference to FIGS. 1 through 3.

Incidentally, in the gas absorption and release apparatus, the same parts as those in the background art are referenced correspondingly.

A gas absorption and release passage 1a is connected to a gas absorption and release container 1 containing a hydrogen storage alloy as a gas absorption and release substance. As a gas absorption side, a hydrogen gas supply unit 4 is connected to the gas absorption and release passage 1a through an electromagnetic valve 2 and a gas supply passage 3. As a gas release side, a gas-using unit 7 is connected to the gas absorption and release passage 1a through an electromagnetic valve 5 and a gas release passage 6.

Further, a flow passage (not shown) for introducing and discharging a heat medium in order to heat and cool the gas absorption and release substance is disposed in the gas absorption and release container 1. A heat medium introduction passage 8 and a heat medium discharge passage 9 extended out of the container are connected to the flow passage.

A cooling heat medium supply unit 12 is connected to the heat medium introduction passage 8 through a pump 10 and a cooling heat medium supply passage 11. Similarly, a heating heat medium supply unit 15 is connected to the heat medium introduction passage 8 through a pump 13 and a heating heat medium supply passage 14. On the other hand, a cooling heat medium return passage 17 is connected to the heat medium discharge passage 9 through an electromagnetic valve 16. Similarly, a heating heat medium return passage 19 is connected to the heat medium discharge passage 9 through an electromagnetic valve 18. Incidentally, the cooling heat medium return passage 17 is connected to a return side of the cooling heat medium supply unit 12 whereas the heating heat medium return passage 19 is connected to a return side of the heating heat medium supply unit 15 so that the heat medium circulates.

Further, a gas pressure signal generator 30 is attached to the gas absorption and release container 1 so that a gas pressure in a gas-receiving space formed in the inside of the gas absorption and release container 1 is detected by the signal generator 30. An output side of the signal generator 30 is connected to a pressure gauge 31. The pressure signal generator 30 and the pressure gauge 31 form a pressure detection means. Further, an output side of the pressure gauge 31 is connected to a control unit 33 for controlling the electromagnetic valves 2, 5, 16 and 18 and the pumps 10 and 13.

The control unit 33 has a setting portion 330 for setting a pressure in advance to be compared with the detected pressure, a judgment portion 331 for judging the limit of gas absorption and release on the basis of comparison between the detected pressure and the setting pressure predetermined in the setting portion 330, a timer portion 332 for measuring lapsed time, and a control portion 333 for sending a control signal to the electromagnetic valves 2, 5, 16 and 18 and the pumps 10 and 13 on the basis of the comparison result in the judgment portion 331.

A method of controlling the gas absorption and release apparatus will be described below.

First, the case where hydrogen is absorbed by a hydrogen storage alloy will be described.

In the control unit 33, the electromagnetic valves and the pumps are controlled in accordance with the absorption of hydrogen. Specifically, the electromagnetic valves 2 and 16 are opened and the electromagnetic valves 5 and 18 are closed. Further, the pump 10 is operated and the pump 13 is stopped.

On this condition, a hydrogen gas is supplied into the gas absorption and release container 1 through the gas supply passage 3 and the gas absorption and release passage 1a. On the other hand, a cooling heat medium is sent out from the cooling heat medium supply unit 12 by the pump 10 and introduced into the gas absorption and release container 1 through the cooling heat medium supply pipe 11 and the heat medium introduction passage 8. This heat medium circulates so that it passes through the flow passage (not shown) in the gas absorption and release container 1 while cooling the hydrogen storage alloy, and then passes through the heat medium discharge passage 9, the cooling heat medium return passage 17 and the electromagnetic valve 16 to return to the cooling heat medium supply unit. Cooling of the hydrogen storage alloy reduces its hydrogen equilibrium dissociation pressure to thereby generate a force of sucking hydrogen. As a result, the hydrogen storage alloy absorbs hydrogen provided from the gas supply unit 4.

On this occasion, the pressure of the gas-receiving space in the gas absorption and release container 1 is made low by the suction force. This pressure is kept in a predetermined value or lower as long as such a suction force is generated in the hydrogen storage alloy. This pressure is measured by the pressure signal generator 30 so that an output signal concerning pressure is obtained. This signal is sent to the pressure gauge 31. The pressure gauge 31 sends out this signal to the control unit 33. Incidentally, on this occasion, the value of pressure may be displayed on the pressure gauge 31 so that the value can be observed by eyes. In the control unit 33, the gas pressure which appears when the hydrogen storage alloy reaches a critical state at the time of gas absorption is set as a gas-absorption setting pressure in the setting portion 330 in advance.

Figure 3:
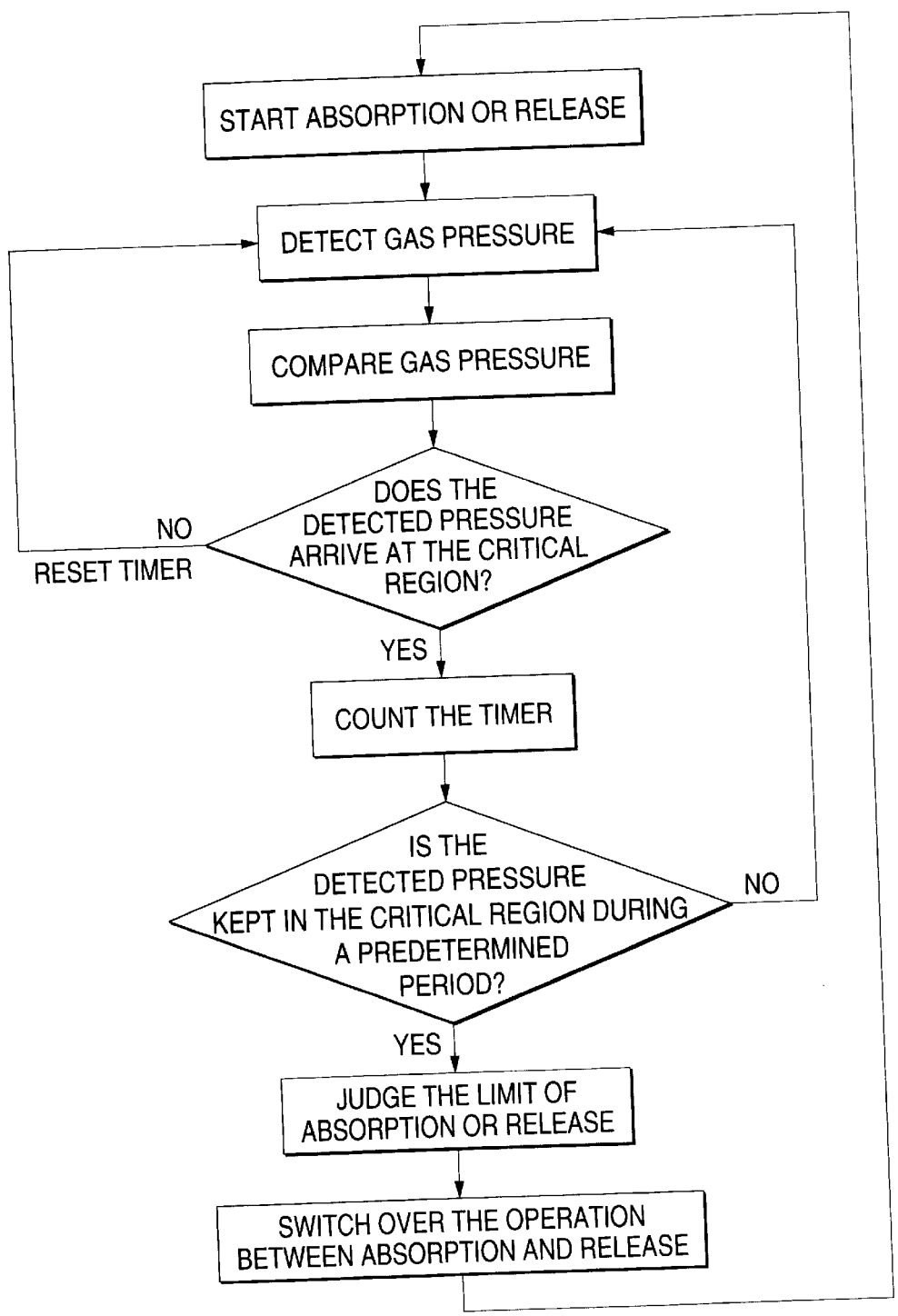
FIG. 3 is a flow chart showing the operation of the control unit in this embodiment.
Figure 4:
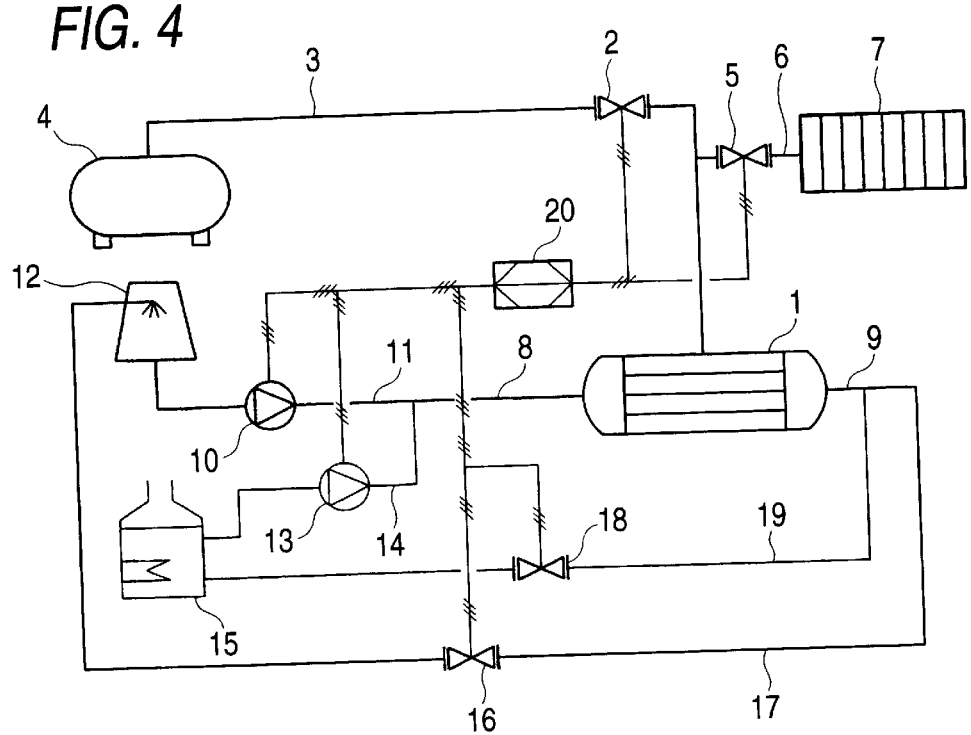
FIG. 4 is a schematic configuration view showing a background-art gas absorption and release apparatus.
Figure 5:
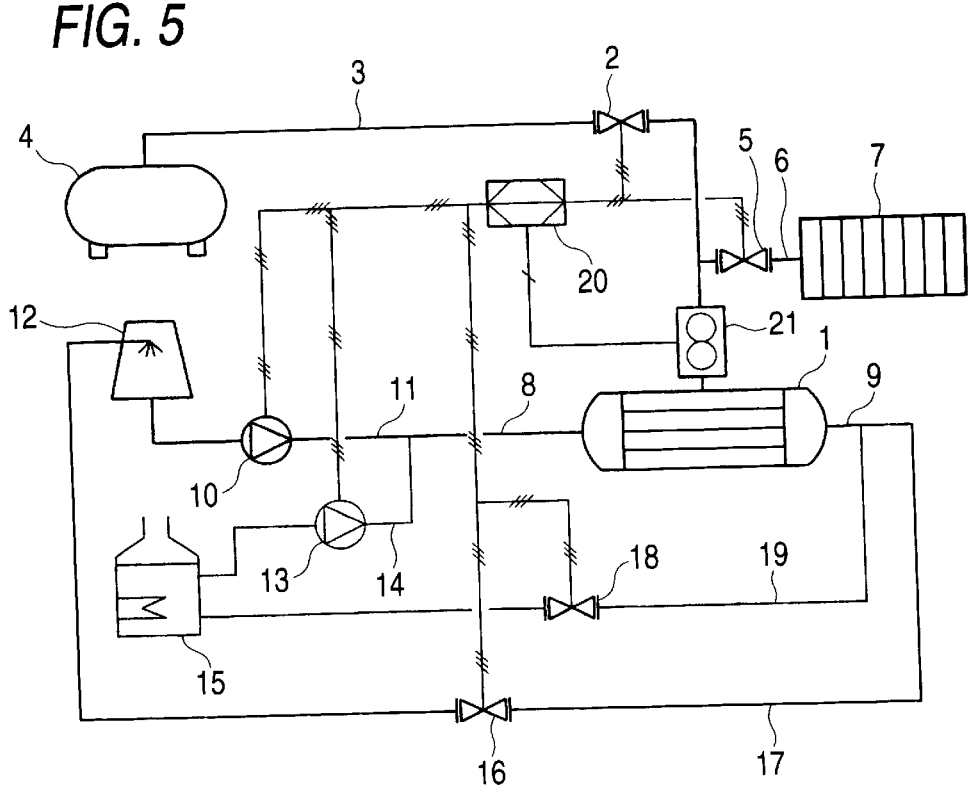
FIG. 5 is a schematic configuration view showing another background-art gas absorption and release apparatus.

As shown in FIG. 3, in the judgment portion 331, the detected pressure is compared with the gas-absorption setting pressure. When the detected pressure becomes higher than the setting pressure, the judgment portion judges the detected pressure's arrival at the critical region and makes the timer 332 count the lapsed time after the arrival. Incidentally, in an initial state of gas absorption, the aforementioned comparing operation is performed after a predetermined lapsed time because the gas pressure is not reduced immediately.

When the condition that the detected pressure higher than the gas-absorption setting pressure is kept for a predetermined setting period after the judgment of the detected pressure's arrival at the critical region, the judgment portion 331 judges the limit of gas absorption. On the contrary, when the aforementioned condition is not kept for the setting period, the judgment portion 331 cancels the judgment of the detected pressure's arrival at the critical region and resets the count of the timer 332 so that the comparison between the detected pressure and the gas-absorption setting pressure is repeated in the judgment portion 331.

After the limit of gas absorption is judged, the result of the judgment is sent to the control portion 333. On the basis of the result of the judgment, the control portion 333 sends out a control signal to the respective electromagnetic valves and pumps to stop the absorbing operation and switch the operation over to a releasing operation.

Specifically, the electromagnetic valves 2 and 16 are closed and the pump 10 is stopped, while the electromagnetic valves 5 and 18 are opened and the pump 13 is operated. As a result, the heating heat medium is sent out from the heating heat medium supply unit 15 by the pump 13 and introduced into the gas absorption and release container 1 through the heating heat medium supply passage 14 and the heat medium introduction passage 8. After the heating heat medium heats the hydrogen storage alloy in the inside of the gas absorption and release container 1, the heating heat medium is discharged from the heat medium discharge passage 9 and returned to the heating heat medium supply unit 15 through the heating heat medium return passage 19 and the electromagnetic valve 18. Thus, the heating heat medium circulates. Hydrogen released from the heated hydrogen storage alloy is transported to the gas-using portion 7 through the gas absorption and release passage 1a, the electromagnetic valve 5 and the gas release passage 6, so that the hydrogen is used for a desired purpose.

As the hydrogen is released, the pressure of the gas-receiving space in the gas absorption and release container 1 is made high by the hydrogen release. This pressure is kept in a predetermined value or higher while hydrogen is being released from the hydrogen storage alloy. This pressure is measured by the pressure signal generator 30 in the same manner as described above, so that pressure data is sent out to the control unit 33 through the pressure gauge 31. The gas pressure which appears when the hydrogen storage alloy reaches a critical state of hydrogen release at the time of gas release is set as a gas-release setting pressure in the setting portion 330 in advance in the same manner as described above. In the control unit 33, the judgment portion 331 compares the detected pressure with the gas-release setting pressure. When the detected pressure is lower than the setting pressure, the judgment portion 331 judges the detected pressure's arrival at the critical region and makes the timer 332 count the lapsed time after the arrival. Incidentally, in an initial state of gas release, the aforementioned comparing operation is performed after a predetermined lapsed time because the gas pressure does not increase immediately.

When the condition that the detected pressure is lower than the gas-release setting pressure is kept for the predetermined setting period after the judgment of the detected pressure's arrival at the critical region, the judgment portion 331 judges the limit of gas release. On the contrary, when the aforementioned condition is not kept for the setting period, the judgment portion 331 cancels the judgment of the detected pressure's arrival at the critical region and resets the count of the timer 332 so that the comparison between the detected pressure and the gas-release setting pressure is repeated in the judgment portion 331.

After the limit of gas release is judged, the control portion 333 sends out a control signal to the respective electromagnetic valves and pumps to stop the releasing operation and switch the operation over to an absorbing operation on the basis of the result of the judgment.

Gas absorption and release can be performed efficiently by repeating the aforementioned operation.

Although the aforementioned apparatus has been described on the condition that one gas absorption and release apparatus is operated, a plurality of gas absorption and release containers may be provided so that the operation can be switched over among the containers in order to obtain stable gas recovery and supply.

As described above, according to the present invention, there is provided a method of controlling a gas absorption and release apparatus by using a gas absorption and release substance in which the gas absorption and release substance is heated and cooled by a high-temperature/low-temperature heat medium and a gas absorption and release reaction attended with heat absorption and generation is produced in the gas absorption and release substance, the method comprising the steps of: detecting a gas pressure at the time of gas absorption/release; and judging a limit of gas absorption/release on the basis of comparison between the detected pressure and a predetermined setting pressure. Hence, an absorbing and releasing operation can be performed at an appropriate time in accordance with the state of the gas absorption and release substance. Hence, a wasteful controlling period can be eliminated while the gas absorption and release substance is prevented from deteriorating. As a result, efficient control can be made.

Further, by judging the limit of gas absorption or release based on whether a relation between the detected pressure and the setting pressure is retained or not for a fixed time, the judgement is less affected by fluctuations in gas pressure within the gas absorption and releasing container due to degrease in the gas absorption/release capacity of the gas absorption and release substance caused by deterioration thereof, fluctuations in the outside air temperature, or the like. As a result, efficient control can be made.

Furthermore, according to the present invention, there is provided a gas absorption and release apparatus using a gas absorption and release substance, comprising a gas absorption and release container for receiving the gas absorption and release substance airtightly, a heat medium supply means for selectively supplying a high-temperature/low-temperature heat medium to the gas absorption and release container to heat and cool the gas absorption and release substance, a gas supply means for supplying a gas to the gas absorption and release container to make the gas absorption and release substance absorb the gas, and a gas transportation means for taking out a gas released from the gas absorption and release substance, from the gas absorption and release container and transporting the gas to a gas-using portion, wherein the apparatus further comprises one pressure detection means provided in at least one place among a gas supply passage between the gas supply means and the gas absorption and release container, a gas receiving space in the gas absorption and release container, and a gas transportation passage in the gas transportation means for detecting a gas pressure, a judgment portion for comparing the pressure detected by the pressure detection means with a predetermined setting pressure so as to judge a limit of gas absorption and release on the basis of the comparison, and an absorption and release control portion for outputting a control signal to switch gas absorption and release to the heat medium supply means, to the gas supply means and to the gas transportation means on the basis of a result of the judgment in the judgment portion. Hence, gas absorption or gas release can be switched over in accordance with the reduction of the absorption and release quantity (capacity) caused by the deterioration of the gas absorption and release substance. Hence, the apparatus can be driven at maximum gas absorption and release capacity at that time. Hence, the number of gas absorption/release times per unit capacity is minimized. Hence, the deterioration of the absorption and release substance hardly progresses, so that sensible-heat loss caused by repetition of heating and cooling of the absorption and release substance and the container is reduced. Hence, energy efficiency is improved. Moreover, because the blank period when the capacity cannot be fulfilled is eliminated, the apparatus can make the full use of its capacity (the quantity of gas recovery and supply per unit time). In addition, wasteful motive power is not required for transporting the heating/cooling heat medium in the blank period, so that high-efficient control can be made.

What is claimed is:

1. A method of controlling a gas absorption and release apparatus wherein gas is absorbed and released by cooling and heating a gas absorption and release substance, said method comprising the steps of:
   detecting a gas pressure at a time of gas absorption or release; and
   judging a limit of gas absorption or release on the basis of comparison between said detected pressure and a setting pressure.

2. A method of controlling a gas absorption and release apparatus according to claim 1,
   wherein judgment of the limit of gas absorption is made when said pressure detected at the time of gas absorption is higher than said setting pressure for gas absorption.

3. A method of controlling a gas absorption and release apparatus according to claim 1,
   wherein judgment of the limit of gas release is made when said pressure detected at the time of gas release is lower than said setting pressure for gas release.

4. A method of controlling a gas absorption and release apparatus according to claim 1,
   wherein judgment of the limit of gas absorption or release is made when relation between said detected pressure and said setting pressure is retained for a fixed time.

5. A gas absorption and release apparatus using a gas absorption and release substance comprising:
   a gas absorption and release container for receiving said gas absorption and release substance airtightly;
   a heat medium supply means for selectively supplying a high-temperature or low-temperature heat medium to said gas absorption and release container so as to heat or cool said gas absorption and release substance;
   a gas supply means for supplying a gas to said gas absorption and release container to make said gas absorption and release substance absorb said gas; and
   a gas transportation means for taking out a gas released from said gas absorption and release substance, from said gas absorption and release container and transporting said gas to a gas-using portion,
   wherein said apparatus further comprises
      a pressure detection means provided in at least one place among a gas supply passage between said gas supply means and said gas absorption and release container,
      a gas-receiving space in said gas absorption and release container, and
      a gas transportation passage in said gas transportation means for detecting a gas pressure,
      a judgment portion for comparing said pressure detected by said pressure detection means with a predetermined setting pressure so as to judge a limit of gas absorption or release on the basis of the comparison, and
      an absorption and release control portion for outputting a control signal to switch gas absorption and release to said heat medium supply means, to said gas supply means and to said gas transportation means in accordance with the judgment in said judgment portion.

* * * * *